United States Patent
Bhattacharya et al.

(10) Patent No.: US 6,826,150 B1
(45) Date of Patent: Nov. 30, 2004

(54) DISTRIBURTED QOS POLICING SYSTEM AND METHOD

(76) Inventors: Dipankar Bhattacharya, 12663 Kinman Ct., Saratoga, CA (US) 95070; Yiren Huang, 1160 Eagle Cliff Ct., San Jose, CA (US) 95120; Raymond Kloth, 12649 Arroya DeArguello, Saratoga, CA (US) 95070; Ketan A. Padwekar, 20100 Rodriguez Ave., #9E, Cupertino, CA (US) 95014

( * ) Notice: Subject to any disclaimer, the term of this patent is extended or adjusted under 35 U.S.C. 154(b) by 0 days.

(21) Appl. No.: 09/969,184

(22) Filed: Oct. 2, 2001

Related U.S. Application Data

(63) Continuation of application No. 09/845,932, filed on Apr. 30, 2000, now abandoned.

(51) Int. Cl.[7] .................... H04L 12/28; H04L 12/56; H04J 3/16; H04J 3/22; G06F 15/173
(52) U.S. Cl. .................... 370/230; 370/414; 370/468; 709/223; 709/235
(58) Field of Search ................ 370/230, 235, 370/412, 414, 417, 418, 428, 429, 468, 231, 236, 229; 709/223, 224, 222, 226, 237, 235

(56) References Cited

U.S. PATENT DOCUMENTS

| | | | | |
|---|---|---|---|---|
| 5,566,163 A | * | 10/1996 | Petit | 370/230 |
| 5,831,971 A | * | 11/1998 | Bonomi et al. | 370/230 |
| 5,953,317 A | * | 9/1999 | Ogasawara et al. | 370/232 |
| 6,032,189 A | * | 2/2000 | Jinzenji et al. | 709/235 |
| 6,097,701 A | * | 8/2000 | Grunenfelder et al. | 370/235 |
| 6,229,788 B1 | * | 5/2001 | Graves et al. | 370/230 |
| 6,320,845 B1 | * | 11/2001 | Davie | 370/230 |
| 6,363,053 B1 | * | 3/2002 | Schuster et al. | 370/230 |
| 6,381,214 B1 | * | 4/2002 | Prasad | 370/230.1 |
| 6,404,735 B1 | * | 6/2002 | Beshai et al. | 370/230 |
| 6,412,000 B1 | * | 6/2002 | Riddle et al. | 709/224 |
| 6,463,068 B1 | * | 10/2002 | Lin et al. | 370/414 |
| 6,463,470 B1 | * | 10/2002 | Mohaban et al. | 709/223 |
| 6,466,984 B1 | * | 10/2002 | Naveh et al. | 709/228 |
| 6,636,480 B1 | * | 10/2003 | Walia et al. | 370/229 |
| 6,636,481 B1 | * | 10/2003 | Yamaguchi et al. | 370/230 |

* cited by examiner

Primary Examiner—Man Phan

(57) ABSTRACT

A method for policing traffic on a computer communications network having a multitude of nodes interconnected by various communications media. An individual policer is established at each node for monitoring and/or policing the traffic incoming to that node. Traffic policy parameters are established for traffic-classes and the policy is implemented at each individual policer. Thresholds may be established and when the thresholds are met or exceeded the individual policer will export the traffic conditions at the respective node. The other individual policers or a master policer will receive the exported information. -The individual policers police the traffic incoming to its associated node depending on the traffic condition information received from all the nodes. Several classes may be handled by each individual policer. Leaky bucket algorithms may be used in some instances.

60 Claims, 6 Drawing Sheets

DISTRIBURTED QOS POLICING SYSTEM AND METHOD

The present application is a continuation of commonly assigned and U.S. patent application Ser. No. 09/845,932. Which application was filed on Apr. 30, 2001 now abandoned and has the same title and inventors as the present application. This prior application is hereby incorporated herein by reference, and priority is claimed therefrom under 35 U.S.C. §120.

BACKGROUND OF THE INVENTION

1. Field of the Invention

The present invention relates generally to computer communications networks, and more particularly to regulating, monitoring and policing traffic on such computer communications networks.

2. Background Information

Enterprises, including businesses, governments and educational institutions, rely on computer networks to share and exchange information. A computer network typically comprises a plurality of entities interconnected by a communications media. An entity may consist of any device, such as a host or end station, that sources (i.e., transmits) and/or receives network messages over the communications media. A common type of computer network is a local area network ("LAN") which typically refers to a privately owned network within a single building or campus. A network device called a "bridge" is often used to implement "bridging" function between entities connected to a LAN. Typically, the bridge is a computer that includes a plurality of ports, which are connected to different entities. The bridging function includes receiving data at a source port that originated from a sending entity, and transferring that data to at least one destination port for forwarding to a receiving entity.

In many instances, several LANs may be interconnected by point-to-point links, microwave transceivers, satellite hook-ups, etc., to form a wide area network ("WAN") or subnet that may span an entire city, country or continent. One or more intermediate network devices are often used to couple LANs together and allow the corresponding entities to exchange information. A router, for example, may be used to provide a "routing" function between two or more LANs. A multi-protocol router is often used to interconnect LANs executing different LAN standards. To perform these tasks, a router, which also is a computer having a plurality of ports, typically examines the destination address and source address of messages passing through the router. Routers typically operate at the network layer or layer-3 of the communications protocol stack utilized by the network, one such protocol is the Internet Protocol (IP) layer of the five layer Transmission Control Protocol/Internet Protocol (TCP/IP) Reference Model. Furthermore, if the LAN standards associated with the source entity and the destination entity are dissimilar (e.g., Ethernet and Token Ring), the router may also alter the format of the packet so that it may be received by the destination entity. Routers also execute one or more routing protocols or algorithms, which are used to determine the paths along which network messages are sent.

Congestion typically refers to the presence of too many packets in a subnet or a portion of a network, thereby degrading the network's performance. Congestion occurs when the network devices are unable to keep up with an increase in traffic. The action of not forwarding a packet is called dropping a packet. Dropping packets often affects multiple upper layer applications simultaneously. Furthermore, many upper layer applications, such as TCP, re-send messages if no acknowledgments are received. The upper layer applications may require global synchronization because of packets being dropped, which may significantly exacerbate the congestion problem.

QoS is a feature that allows dropping of packets on a selective basis to avoid or reduce congestion in the network. Two components of QoS are "classification" and "policing." Packets are classified into different traffic classes according to policy set by the network administrator. For each class, a policing algorithm is used to measure the incoming traffic and compare that measure with policing parameters set by the network-administrator. As a result of policing, depending on the current traffic-rate for this class of traffic, a packet may be found "in profile" or "out of profile" by the policing algorithm. An out of profile packet is dropped or marked. Marking increases the probability of the packets being dropped later by another device that applies QoS to the packet. A packet that is dropped or marked by the policing algorithm is referred to as a "policed" packet. An in profile packet is forwarded without marking and is referred to as a packet "permitted" by the policing algorithm.

Various algorithms exist to perform policing. Each of these algorithms is implemented in a single logic-module called policer that performs the same computation for all packets belonging to a traffic class. Such a policer is referenced as a centralized policer, since the same module needs to perform the computation for all packets belonging to a traffic class. One such policing algorithm limits the total number bytes in all packets permitted in any arbitrary time-interval, T, to the value of (T* contract_rate+burst). Here and as defined below, "contract rate" is a policing policy parameter meaning information per unit time, and "burst" is another policing policy parameter meaning the maximum information permitted in excess of the rate. This can be implemented in a policer called the token-bucket policer, which performs the following computation for every packet in a traffic class:—

```
last_update_time = current_time;
bucket -= (contract_rate * (current_time - last_update_time));
if (bucket < 0)
    bucket = 0;
if ((bucket + packet_length) > burst)
    police_packet( );    // packet out-of-profile => police
else {
    permit_packet( );    // packet in-profile => permit
    bucket += packet_length;
}
``` where:—
current_time is a free-running counter that measures time,
packet_length is the number of bytes in the current packet and
last_update_time and bucket are states stored for each traffic class A centralized policer requires all packets to be processed for policing in a single logic-module. So, packets that are processed in different logic modules cannot belong to the same traffic-class. An object of the present invention is to allow packets arriving at multiple logic-modules to be policed as a single traffic-class. Similarly, an associated object of the present invention is to allow packets arriving at multiple network devices to be policed as a single traffic class. The invention requires each such logic-module to send information about packets that the logic module processed to other such logic-modules. There is a cost associated with the communication capacity used for exchanging such information. If such "overhead" information is sent less often, it uses less of the capacity of the communication system, but it also decreases the accuracy of policing.

Token based policers are known in the art. One such method is disclosed in U.S. Pat. No. 5,831,971, filed Aug. 22, 1996 and issued Nov. 3, 1998, assigned to Lucent Technologies, Inc. This patent incorporates a token based "leaky bucket" algorithm with queuing algorithms arranged to comply with a given policing policy and to shape traffic incoming to a node into a compliant outgoing stream via some link. However, this patent does not disclose a policing of a class of traffic across an entire network.

It is an object of the present invention to provide different mechanisms to trigger export of information from a logic-module in order to provide flexibility of optimizing cost-accuracy tradeoff in policing traffic class or classes across a part or an entire network.

SUMMARY OF THE INVENTION

The present invention overcomes the limitations of the prior art by providing a system and method of employing multiple modules in one or more network devices to police a single traffic-class or multiple classes. And wherein such policing can be extended to operate across an entire network.

The inventive system and method implements the policing policy across the entire network, or part thereof, by providing many modules referenced as individual policers. Each individual policer can observe and police only a part of the traffic. In this system each individual policer uses "global state variables" that stores the measure traffic for the entire traffic-class and "local state variables" that store the measure of the part of traffic that is permitted by this individual policer. Each individual policer exports the measure of traffic it permitted to all individual policers, in the form of the local state variables, or functions thereof. After exporting such information, the individual policer clears the local state variables. Upon receiving such exported information, all the individual policers update their global state variables. At any time, the global state variables of an individual policer account for the total of all the measure of traffic exported from all individual policers till that time. At any time, the local state variables of an individual policer account for the traffic that was permitted at the same individual policer since it last exported the measure of traffic it permitted.

The present invention provides individual policers that monitor and police part of the traffic. In order to accomplish this policing by individual policers the contract rate and the burst for an entire traffic class is provided to the individual policers. The individual policers measure their parts of the traffic and export that information to all the other individual policers. There is a mechanism for receiving, totalizing and storing the individual policer information exchanged from all the individual policers. That total is then compared to the contract rate and burst for the entire traffic class and a policing decision is made by each individual policer for its part of the traffic class. In an embodiment, there is a master policer that receives all the information from all the individual policers and applies the contract rate and the burst and makes policing decisions for the individual policers that is then sent back to the individual policers.

In other embodiment, the information can be accumulated and stored at the individual policers and where the individual policers store the own information and that of the other individual policers.

In other embodiment, there is a threshold established wherein the individual policer broadcasts its information to the other individual policers only when a threshold, previously set in accordance with the overall policing policy is determined for each individual policer, is exceeded. In another related embodiment, the individual policer exports its information containing only the new data received since the last such export in accordance with a time limit that is exceeded. A threshold also may be established wherein the individual policer exports its measure of its part of the traffic when the amount of data locally permitted exceeds a set local-rate threshold.

In yet other preferred embodiment, the individual policers export information applicable to multiple classes of traffic, and wherein the information is contained in one message. This information may be exported via the same medium used in the network, or alternatively the information may be sent via a medium separate from that used in the network.

In yet other embodiment, the present invention may be used together with token leaky bucket algorithms incorporating the above discussed elements to advantage.

In a preferred embodiment, the policing decision for each packet is made using a modified version of the token bucket algorithm, and including thresholds wherein the information messages between individual policers occurs only when these thresholds are exceeded. Such thresholds may be on the data received and/or time from last up date or combinations of both. Moreover, it is possible to interchange the information between the individual policers via channels or a medium outside that of the network itself. For example, dial up telephone/fax lines, and the like. However, the same principle may be employed to other centralized policing algorithms.

Various techniques are invented to trigger the export of information from the individual policers. This allows various means to reduce information exchanged between policers and increase the accuracy of policing. One technique may be superior to others in a given implementation in a given traffic condition.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
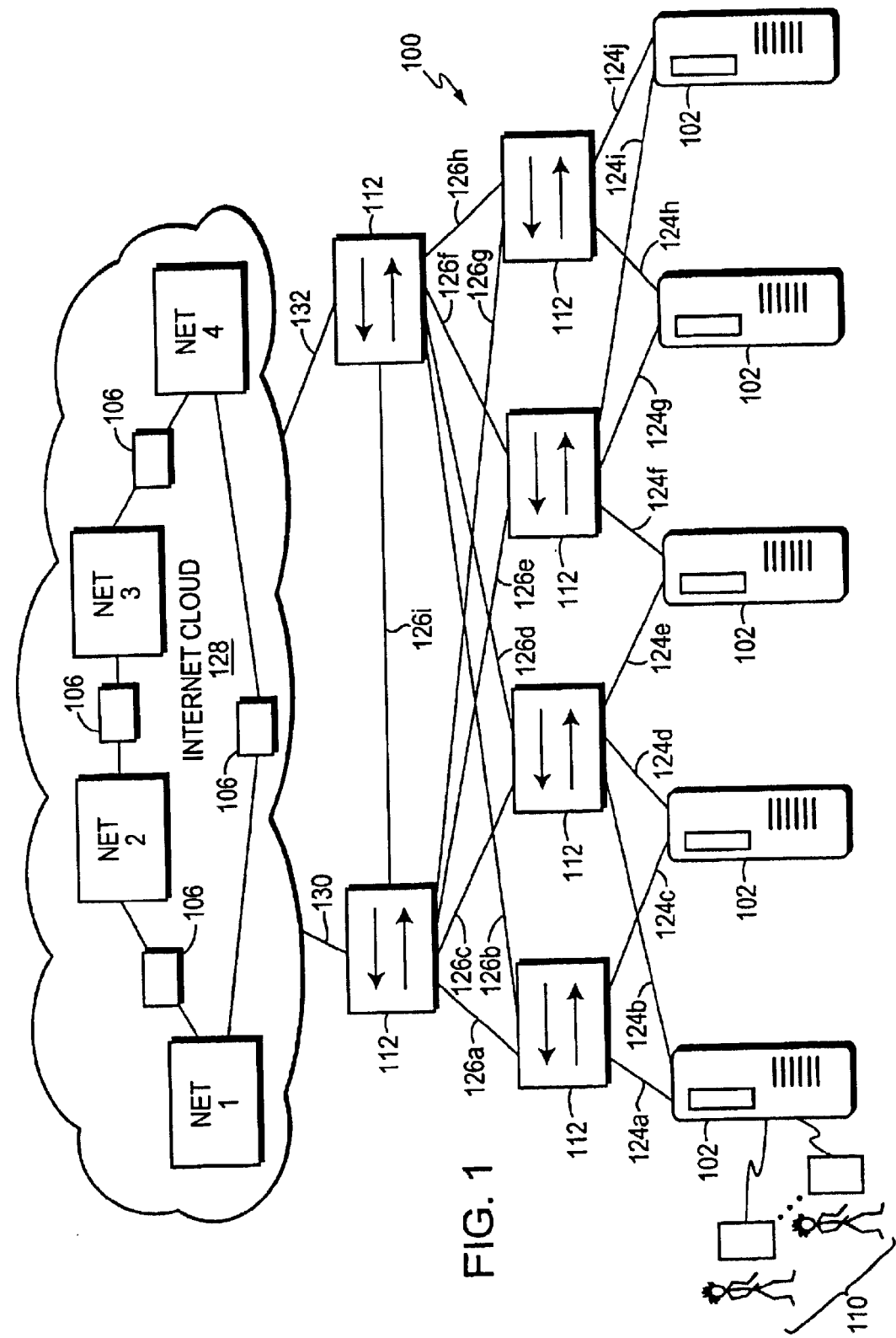
FIG. 1 is a diagram of a computer network.

FIG. 1 is a highly schematic illustration of a computer network 100. The network 100 includes a plurality of servers 102 that are preferably configured as web-hosting servers. A number of users 110 are shown connecting to one of the host 102, but typically there will a number of users that are connected to each host. The network 100 further includes a plurality of intermediate network devices 112, such as backbone routers, high-speed switches, etc. Each host 102 is preferably coupled to two or more of the devices 112 by respective trunks or links 124($a$ . . . $j$). Significantly, the network 100 is formed from a multitude of smaller networks, herein shown as NET 1–4. These smaller networks are interconnected together by routers 106. These smaller included networks, considered all together are the Internet 128. In a preferred embodiment, the devices 112 and the routers 106 may include similar designs. Links 126(a . . . i) interconnect devices 112, and links 130, 132 connect devices 112 to Internet 128.

It should be understood that the configuration of network 100 is meant for illustrative purposes only, and that the present invention will operate with other, possibly far more complex, network designs or topologies.

Quality of service policing of individual switches and routers is well known in the field, and the present invention can be used advantageously with virtually any known policing system. Since such policers are so well known only a brief overview is provided herein. More fully developed details may be found in the U.S. patent application, assigned to the same entity as is this application, entitled METHOD AND APPARATUS FOR PERFORMING HIGH SPEED TRAFFIC SHAPING, Ser. No. 09/560,499 filed on Apr. 27, 2000, and incorporated herein by reference.

Figure 2:
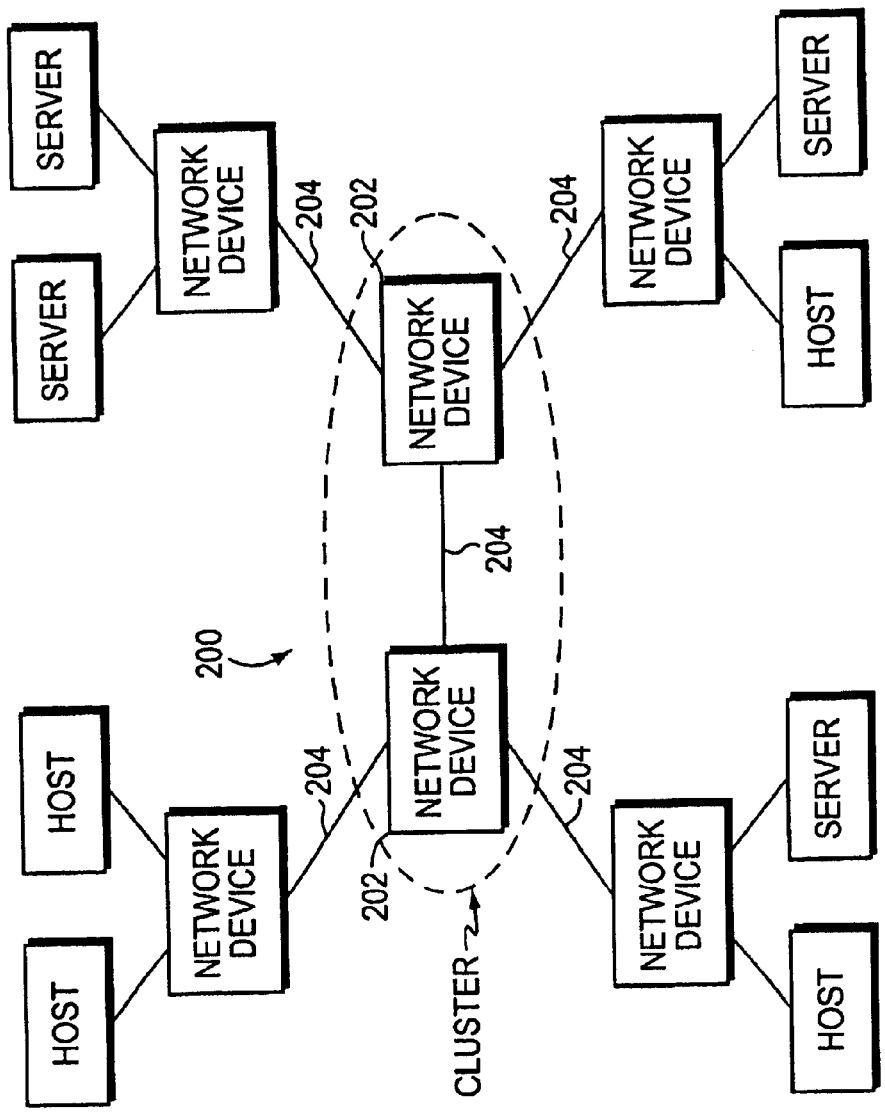
FIG. 2 is another diagram of a computer network depicting network devices.
Figure 3:
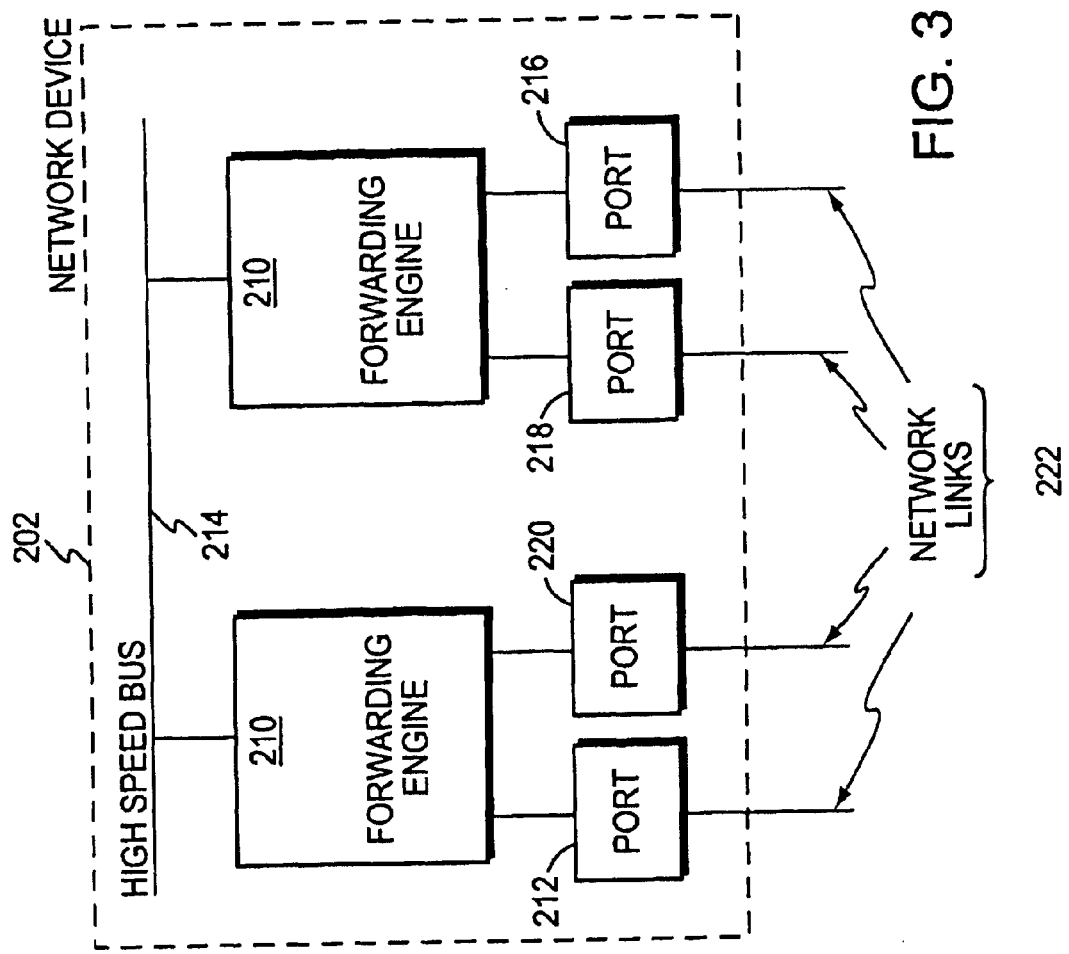
FIG. 3 is a block diagram of a network device.

FIG. 2 is another depiction of a network 200 that includes multiple instances of network devices 202 connected by network links 204. A set of directly connected network devices 202 in this network form a cluster over which a traffic class can be policed. As shown in FIG. 3, each network device 202 in this cluster includes one or more instances of modules called forwarding engines 210. Each forwarding engine performs bridging and/or routing function and implements an individual policer for distributed policing.

FIG. 3 is the example of a network device that includes multiple instances of a module called forwarding engine 210. Each forwarding engine 210 is directly connected to a set of ports 212, 220, 216, and 218. Each port is connected to a network link 222 that connects to another device, some of which may be other network devices. In this example, all the forwarding engines in the same network device are connected together by a high-speed bus 214. Note that the forwarding engines are connected by a bus for illustrative purposes only. They can be connected by other means like a switch-fabric, etc. When a packet arrives from a network link to a port, say 216, it is processed in a module called the forwarding engine attached to that port. As a result of that processing the packet is either dropped or forwarded to another port, say 218 attached to the same forwarding engine, or forwarded across the high-speed bus 214 to another port attached to a different forwarding engine. In the last case, the packet goes from the high-speed bus through the forwarding engine attached to the destination port, without any processing in that forwarding engine.

Figure 4:
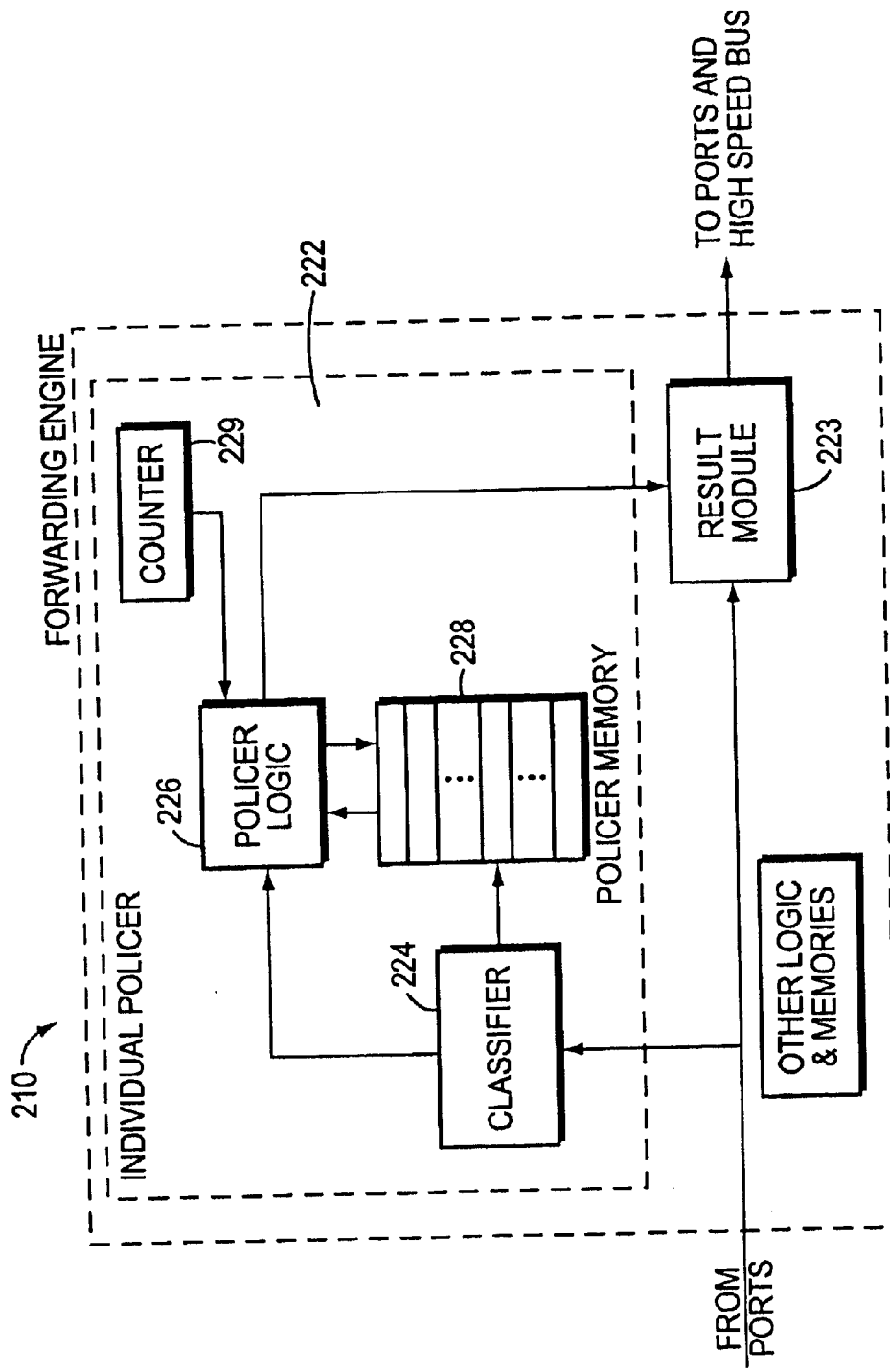
FIG. 4 is a block diagram of a forwarding engine.

FIG. 4 shows details of a forwarding engine 210. In this preferred embodiment, each forwarding engine includes a submodule, called the individual policer 222, which, in this example, implements a distributed version of the token-bucket algorithm. The output of the individual policer is sent to another module, called the result module 223, that forwards, drops or marks the packet.

The individual policer includes logic 226 and memory 228. The individual policer logic transmits packets, called the Policer Update Packet or PUP, to other individual policers. The memory in the individual-policer, referenced as policer-memory, stores a record for each traffic class. The following variables are stored in each such record:

| Policer memory fields | Description |
| --- | --- |
| contract_rate | Parameter used to define policing policy for a traffic class in distributed token bucket algorithm here meaning information per unit time. |
| burst | Parameter used to define policing policy for a traffic class in distributed token bucket algorithm here meaning maximuminformationermitted in excess of rate. |
| byte_count_local | Local state variable stored by an individual policer for a traffic class to implement the distributed token bucket algorithm |
| bucket | Global state variable stored by an individual policer for a traffic class to implement the distributed token bucket algorithm |
| last_update time | Global state variable stored by an individual policer for a traffic class to implement the distributed token bucket algorithm |
| byte_threshold | Parameter used in one mechanism of triggering PUP transmission. |
| time_threshold | Parameter used in one mechanism of triggering PUP transmission. |

Figure 5:
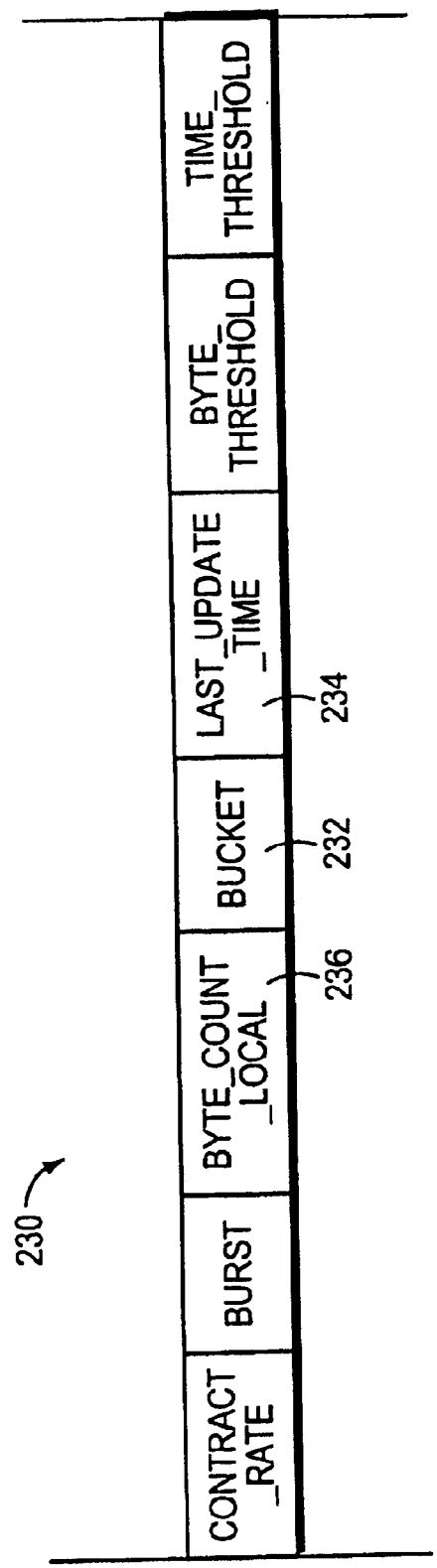
FIG. 5 is a diagram of a policer memory record.

The individual policer includes a free-running counter 229. A packet that is monitored and regulated by an individual policer is referenced as a local packet. Another part of the individual policer logic referenced as classifier 224 examines each local packet and selects a record in the policer-memory that corresponds to the traffic-class of that packet. The classifier also extracts a number, referenced as packet_length, that represents the size of the packet. As shown in FIG. 5, the policer-memory record 230 selected by the classifier includes two global state variables, bucket 232 and last_update_time 234, that store the measure of traffic for the entire traffic-class. The record also includes one local state variable, byte_count_local 236, that stores the measure of the part of traffic that is permitted by this individual policer.

When a forwarding engine processes a packet from a directly attached port, a logic module in the individual policer, referenced as policer-logic, uses the packet length, the policer-memory record and the value of the free-running counter, referenced as current_time, to perform the computation represented in the following pseudo-code:—

```
if ((packet_length + byte_count_local + bucket
    - contract_rate*(current_time - last_update_time)) > burst)
    {
    police_packet( );     /* packet out of profile => police */
    }
else
    {
    permit_packet( );     /* Packet in profile => permit */
    byte_count_local += packet_length;
    }
/* decision to send a PUP */
if (pup_transmit_condition)   /* send PUP & update bucket */
    {
    / * Send PUP to other individual policers */
    transmit_pup(traffic_class, byte_count_local);
    /* update bucket in this individual policer */
    bucket += (byte_count_local
            - contract_rate*(current_time
                    - last_update_time));
    if (bucket < 0)
        bucket = 0;
```

-continued

```
last_update_time = current_time;
byte_count_local = 0;
}
```

The new values of bucket, last_update_time and byte count_local, as computed by the above pseudo-code, are written back to the same policer memory record. The "police_packet( )" and "permit_packet( )" referenced in the preceding pseudocode refers to the action of permitting or policing packets. The "transmit pup (traffic_class, byte_count_local)", referenced in the preceding pseudo-code, refers to the action of sending the ordered pair of policer-memory address and byte_count_local to other individual policers in the payload of a packet called the Policer Update Packet or PUP. The PUP is sent to other network devices over the links that connect those devices. The PUP is sent to other forwarding engines inside the same network device over the high-speed bus that connects the forwarding engines. An update is sent, i.e. PUP is transmitted, when a variable referenced as "pup_transmit_condition" is computed to be true. In one implementation, the PUP is transmitted when the byte_count_local exceeds a certain value. In another implementation, the PUP is transmitted when the elapsed time since last PUP transmission exceeds a certain value. In these two alternate implementations, the "pup_transmit_condition", is computed as follows:—

```
Implementation-1:
pup_transmit_condition = (byte_count_local > byte_
threshold);
Implementation-2:
pup_transmit_condition = ((current_time - last_update_
time)
                          > time_threshold);
```

When a forwarding engine receives a PUP, the classifier in the individual policer of that forwarding engine selects the record in the policer-memory selected by the traffic_class field in the payload of the PUP. The classifier also sends the byte_count in the payload of the PUP, referenced as PUP->byte_count, to the policer-logic and indicates to the policer-logic that a PUP has been received. The policer-logic uses the policer-memory record, current_time and PUP->byte_count to compute new values of bucket and last_update_time, which are written back to the same policer-memory record. The computation in the policer logic, in this case, is represented in the following pseudo-code:—

```
bucket += (PUP->byte_count)
        - (contract_rate * (current_time -
                            last_update_time));
if (bucket < 0)
    bucket = 0;
last_update_time = current_time;
```

Following is a summary of the terms defined in the previous paragraphs:—

| Variables/actions | Description |
|---|---|
| packet_length | Size of the packet |
| current_time | Value of free running counter used by the policing algorithm to measure time |
| PUP | Policer Update Packet. An individual policer transmits the value stored in the byte_count_local to other individual policers in the payload of such a packet. |
| PUP->byte_count | Field in the payload of a PUP received that carries the value of the byte_count_local from another individual policer. |
| police_packet( ) | The action of policing a packet |
| permit_packet( ) | The action of transmitting a packet |
| transmit_pup(x,y) | The action of transmitting a Policer Update Packet or PUP. "x" represents the traffic-class identifier and "y" represents the value of byte_count_local carried in the payload of the PUP transmitted. |
| pup_transmit_condition | Condition to transmit PUP. |

Another implementation uses additional variables to trigger PUP transmission. This is referred to as "local_bucket based PUP transmission". In this case, the following extra variables are used:—

| Additional Variables | Description |
|---|---|
| local_rate | Parameter used to compute PUP transmission condition in local_bucket based PUP transmission. |
| local_threshold | Parameter used to compute PUP transmission condition in local_bucket based PUP transmission. |
| local_bucket | State variable stored to compute PUP transmission condition in local_bucket based PUP transmission. |
| last_seen_time_stamp | State variable used to compute PUP transmission condition in local_bucket based PUP transmission. |

For the local_bucket based PUP transmission, pseudocode describing the operation of an individual policer upon reception of a PUP is the same as in that presented earlier. However, the operation upon reception of a local packet that belongs to a traffic-class is different, as described in the following pseudo-code:—

```
if ((packet_length + byte_count_local + bucket -
    contract_rate*(current_time - last_update_time)) > burst)
    {
    police_packet( );    /* packet out of profile => police */
    }
    local_bucket -= local_rate * (current_time -
last_seen_time_stamp);
    if (local_bucket < 0)
        local_bucket = 0;
    last_seen_time_stamp = current_time;
    }
else
    {
    permit_packet( );    /* Packet in profile => permit */
    byte_count_local += packet_length;
    local_bucket += packet_length -
```

```
        local_rate* (current_time - last_seen_time_stamp);
    if (local_bucket < 0)
        local_bucket = 0;
    last_seen_time_stamp = current_time;
}
/* decision to send a PUP */
if (local_bucket > local_threshold) /* send PUP & update bucket */
{
    /* Send PUP to other individual policers */
    transmit_pup(byte_count_local);
    /* update bucket in this individual policer */
    bucket += (byte_count_local
            - contract_rate*(current_time
                - last_update       time));
    if (bucket < 0)
        bucket = 0;
    last_update_time = current_time;
    byte_count_local = 0;
}
```

Figure 6:
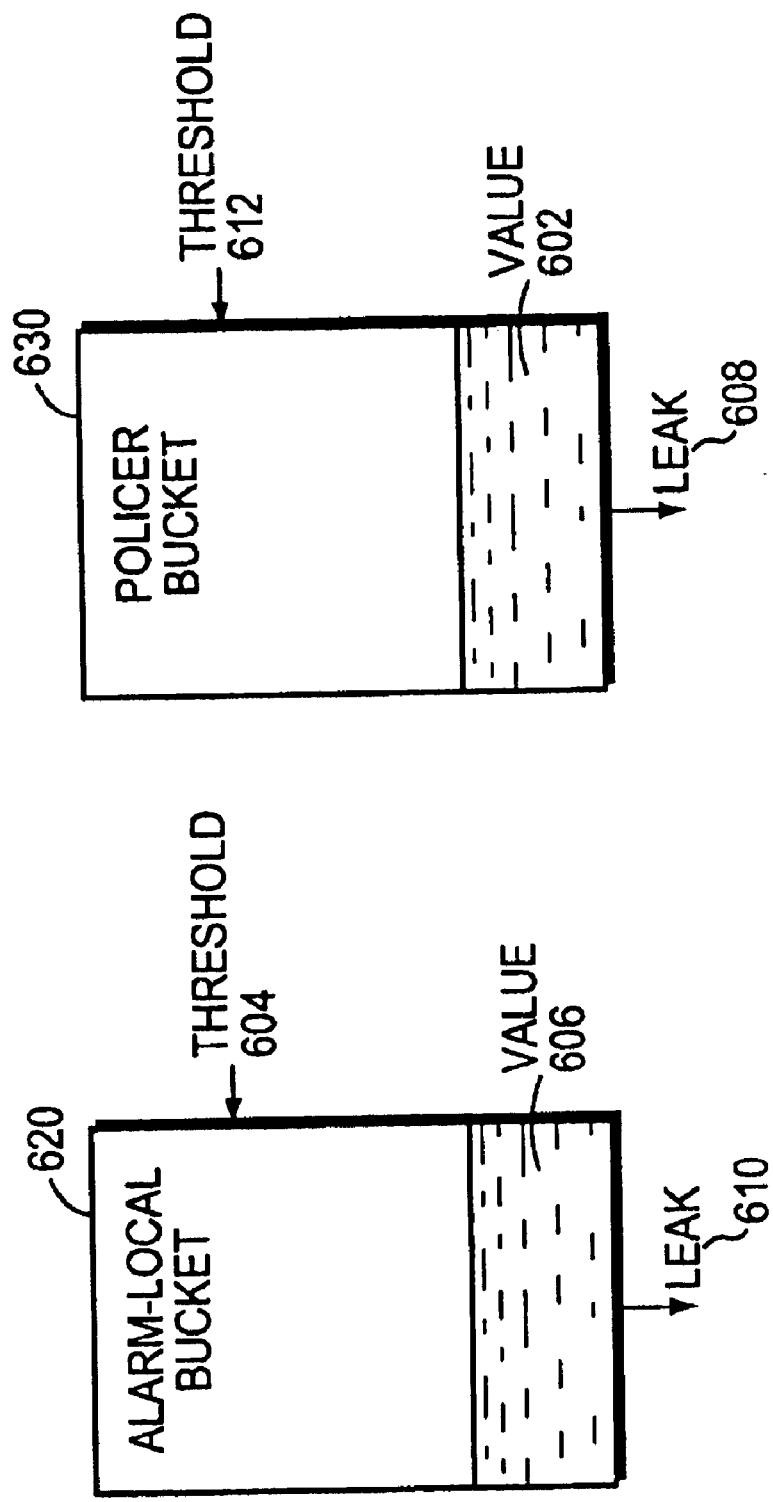
FIG. 6 is a diagram of two leaky buckets of an embodiment.

FIG. 6 shows diagrammatically the logic of a individual policer which implements local_bucket based PUP transmission. In a preferred embodiment, the traffic policer algorithm may be implemented in hardware through a plurality of registers and combinational logic configured to produce sequential logic circuits and cooperating state machines. Those skilled in the art will recognize that other combinations of firmware, software and hardware components in addition to those specifically described herein may be advantageously utilized to achieve the objectives of the present invention. FIG. 6 shows two leaky buckets —a local alarm bucket and a policing bucket. The policer bucket 630 is used to make the policing decision for local packets. When a local packet is received, the leak 608 is computed as the product of the contract_rate and the elapsed time since the last update of the policing bucket. If the sum of the packet length of the local packet, the value 602 of the policing bucket and the byte_count_local, which is the recently accumulated local byte count, less the leak 608, exceeds the threshold 612 of the policing bucket, the local packet is policed. The threshold 612 of the policing bucket is also called burst. The local alarm bucket 620 is used as a method for determining when traffic information is to be distributed to the other policers in the system i.e. a PUP is to be transmitted. When a local packet is received, the value 606 of the local alarm bucket is incremented by the packet-length of the local packet and decremented by the leak 610, which is the product of local_rate and the time elapsed since the last local packet reception. When the value 606 of the local alarm bucket reaches or exceeds the threshold 604, a PUP is transmitted, whereby the recently accumulated local byte count is transmitted to all the individual policers, including the one sending the update. Upon receiving a PUP, all the individual policers update their policing bucket by adding the received byte count and subtracting the leak 608, which is the product of the contract_rate and the time elapsed since the last update of the policing bucket. The local alarm bucket has a leak rate 610 that is, in this embodiment, an apportioned part of the aggregate network leak rate, and the local alarm threshold is set to a value determined by the accuracy required of the overall policing policy.

What is claimed is:

1. A method for policing a traffic-class for a network using a plurality of individual policer, where each individual policer monitors and polices part of the traffic, the method comprising the steps of:

setting policing parameters to limit traffic for the entire traffic-class, accumulating the measure of local traffic at each individual policer for multiple units of data for this traffic class, exporting that accumulated measure of local traffic from each individual policer, receiving and calculating the total of the measure of local traffic from each individual policers, comparing that total measure with the policing parameters for the entire traffic-class, and arriving at policing decision for the traffic belonging to this traffic class.

2. The method as defined in claim 1 further comprising the step of:

designating a master policer, wherein the step of receiving and calculating is performed only at the master policer, and wherein each individual policer exports the measure of local traffic only to the master policer and the master policer sends the total measure of traffic at all individual policers back to all the individual policers.

3. The method as defined in claim 1 wherein the steps of exporting and receiving and calculating and comparing and arriving are performed by each individual policer.

4. The method as defined in claim 1 further comprising the step of:

setting a threshold for the amount of traffic at and for each individual policer; and wherein each individual policer performs the step of comparing its accumulated measure of local traffic to the threshold, and if the threshold is exceeded, then exporting the accumulated measure of local traffic.

5. A method for policing a traffic class for a network using a plurality of individual policers, where each individual policer monitors and polices part of the traffic, the method comprising the steps of:

setting policing parameters to limit traffic for the entire traffic class, accumulating the measure of local traffic at each individual policer for multiple units of data for this traffic class, exporting the accumulated measure of local traffic from each individual policer;

receiving and calculating the total of the accumulated measure of local traffic from each individual policer, comparing that total measure with the policing parameters for the entire traffic class, arriving at policing decision for the traffic belonging to this traffic class; and setting an elapsed time threshold, and wherein each individual policer performs the step of comparing the time elapsed since the last export of the accumulated measure of local traffic from a individual policer, to the elapsed time threshold, and if the threshold is exceeded, then exporting the accumulated measure of local traffic that arrived during the elapsed time.

6. A method for policing a traffic class for a network using a plurality of individual policers, where each individual policer monitors and polices part of the traffic, the method comprising the steps of:

setting policing parameters to limit traffic for the entire traffic class wherein the policing parameters include a local rate, accumulating the measure of local traffic at each individual policer for multiple units of data for this traffic class, exporting the accumulated measure of local traffic from each individual policer, receiving and calculating the total of the accumulated measure of local traffic from each individual policer, comparing that total of the accumulated measure with the policing parameters for the entire traffic-class, arriving at policing decision for the traffic belonging to this traffic class, and setting a threshold for the traffic rate at each individual policer in excess of a set local rate, and wherein each individual policer performs the step of comparing the excess amount to the threshold and if exceeded, exporting the accumulated measure of local traffic.

7. The method as defined in claim 1 further comprising setting policing parameters for multiple traffic classes, and where each individual policer performs the steps of exporting its measure of the traffic for each of the multiple classes of traffic in one message.

8. The method as defined in claim 1 wherein the individual policers export their measure of the traffic using the same communication medium used by the network for the traffic being measured.

9. The method as defined in claim 1 wherein the individual policers export their measure the traffic using a medium separate from the medium used by the network for the traffic being measured.

10. A method for policing a traffic class for a network using a plurality of individual policers, where each policer monitors and polices part of the traffic, the method comprising the steps of:

configuring each individual policer with a policing bucket, setting contract-rate and burst as policing parameters to limit traffic for the entire traffic class, accumulating the packet length of multiple local packets in a variable called byte-count at each individual policer for this traffic class, exporting the accumulated byte-count from each individual policer, receiving the accumulated byte-count and calculating the policing bucket leak as the product of the contract-rate and the time elapsed since the last update of the policing bucket, incrementing the policing bucket with the accumulated byte-count less the policing bucket leak, calculating, for each local packet, the sum of the policing bucket, accumulated byte-count and the packet-length of the local packet, less the policing bucket leak to obtain a calculated total, and when the calculated total exceeds the policing parameter burst, policing the local packet.

11. The method as defined in claim 10 further comprising the steps of:

defining a local alarm bucket in each individual policer, defining a leak rate and threshold for the local alarm bucket, calculating, for each local packet, the leak of the local alarm bucket as the product of the local alarm bucket leak rate and the time elapsed since the arrival of the last local packet, incrementing, for each local packet, the local alarm bucket by the packet-length of the local packet less the local alarm bucket leak, and, when the value of the local alarm bucket exceeds the threshold for the local alarm bucket, exporting the accumulated byte-count to all the individual policers, including the individual policer performing the update.

12. A system for policing a traffic-class for a network using a plurality of individual policer, where each individual policer monitors and polices part of the traffic, the system comprising:

policing parameters to limit traffic for the entire traffic-class, means for accumulating the measure of local traffic at each individual policer for multiple units of data for this traffic class, means for exporting that accumulated measure of local traffic from each individual policer, means for receiving and calculating the total of the measure of local traffic from each individual policers, a comparator for comparing that total measure with the policing parameters for the entire traffic-class, and a policing decision for the traffic belonging to this traffic class.

13. The system as defined in claim 12 further comprising:

a master policer that includes the means for receiving and calculating, and means for each individual policer to export the measure of local traffic only to the master policer, and means for the master policer to send the total measure of traffic at all individual policers back to all the individual policers.

14. The system as defined in claim 12 wherein each individual policer includes the means for exporting and receiving, the means for calculating, the comparator, and the policing decision.

15. The system as defined in claim 12 further comprising:

a threshold for the amount of traffic at and for each individual policer; and means for exporting the accumulated measure of local traffic by each individual policer when the comparator determines that its accumulated measure of local traffic exceeds the threshold.

16. A system for policing a traffic-class for a network using a plurality of individual policers, where each individual policer monitors and polices part of the traffic, the system comprising:

policing parameters to limit traffic for the entire traffic-class, means for accumulating the measure of local traffic at each individual policer for multiple units of data for this traffic class, means for exporting the accumulated measure of local traffic from each individual policer, means for receiving and calculating the total of the accumulated measure of local traffic from each individual policer, a comparator for comparing the total of the accumulated measure of local traffic with the policing parameters for the entire traffic class, a policing decision for the traffic belonging to this traffic class, means for setting an elapsed time threshold, a time comparator, at each individual policer, that compares the time elapsed since the last export of the accumulated measure of local traffic from a individual policer, to the elapsed time threshold, and means for exporting the accumulated measure of local traffic that arrived during the elapsed time, wherein the means for exporting is operated if the time threshold is exceeded.

17. A system for policing a traffic-class for a network using a plurality of individual policers, where each individual policer monitors and polices part of the traffic, the system comprising:

policing parameters to limit traffic for the entire traffic-class wherein the policing parameters include a local rate, means for accumulating the measure of local traffic at each individual policer for multiple units of data for this traffic class, means for exporting the accumulated measure of local traffic from each individual policer, means for receiving and calculating the total of the accumulated measure of local traffic from each individual policer, a comparator for comparing the total of the accumulated measure with the policing parameters for the entire traffic class, a policing decision for the traffic belonging to this traffic class, means for setting a threshold for the traffic rate at each individual policer in excess of a set local rate, and a comparator, in each individual policer, that compares the excess amount to the threshold for the traffic rate, and means for exporting the accumulated measure of local traffic, wherein the means for exporting is operated, if the threshold for the traffic rate is exceeded.

18. The system as defined in claim 12 further comprising means for setting policing parameters for multiple traffic classes, and wherein each individual policer includes means for exporting its measure of the traffic for each of the multiple classes of traffic in one message.

19. The system as defined in claim 12 wherein the individual policers export their measure of the traffic using the same communication medium used by the network for the traffic being measured.

20. The system as defined in claim 12 wherein the individual policers export their measure the traffic using a medium separate from the medium used by the network for the traffic being measured.

21. A system for policing a traffic class for a network using a plurality of individual policers, where each individual policer monitors and polices part of the traffic, the system comprising:

means for configuring each individual policer with a policing bucket, means for setting contract-rate and burst as policing parameters to limit traffic for the entire traffic class, means for accumulating the packet length of multiple local packets in a variable called accumulated byte-count at each individual policer for this traffic class, means for exporting the accumulated byte-count from each individual policer, means for receiving the accumulated byte-count and calculating the policing bucket leak as the product of the contract-rate and the time elapsed since the last update of the policing bucket, means for incrementing the policing bucket with the accumulated byte-count less the policing bucket leak, means for calculating, for each local packet, the sum of the policing bucket, accumulated byte-count and the packet-length of the local packet, less the policing bucket leak to obtain a calculated total, and means for policing the local packet that operates when the calculated total exceeds the policing parameter burst.

22. The method as defined in claim 21 further comprising:

a local alarm bucket in each individual policer, a leak rate and threshold for the local alarm bucket, means for calculating, for each local packet, the leak of the local alarm bucket as the product of the local alarm bucket leak rate and the time elapsed since the arrival of the last local packet, means for incrementing, for each local packet, the local alarm bucket by the packet-length of the local packet less the local alarm bucket leak, and means for exporting the accumulated byte-count to all the individual policers, including the individual policer performing the update, when the value of the local alarm bucket exceeds the threshold for the local alarm bucket.

23. A method for policing traffic, comprising:

monitoring and policing a part of a traffic class on a computer network, said part of a traffic class passing through a network device;

accumulating a measure of local traffic at said network device for multiple units of data for said traffic class as an accumulated measure of local traffic;

exporting said accumulated measure of local traffic to other network devices by transmitting a policer update packet (PUP);

receiving other policer update packets from said other network devices;

calculating, in response to said accumulated measure of local traffic and in response to said other policer update packets, a total measure of traffic of said class;

comparing said total measure with a set of policing parameters for an entire traffic class; and setting policing parameters to limit traffic for said entire traffic class.

24. The method as in claim 23 further, comprising:

arriving at policing decisions for said part of said traffic class passing through said network device.

25. The method as in claim 23 further comprising:

designating a master policer, exporting said accumulated measure of local traffic only to said master policer; and receiving from said master policer said total measure of traffic accumulated by said master policer from policer update packets received by said master policer from other policers.

26. The method as in claim 23 further comprising:

setting a threshold for an amount of traffic for said policer; and comparing said accumulated measure of local traffic to said threshold, and if said threshold is exceeded, then exporting said accumulated measure of local traffic.

27. A method for policing traffic, comprising:

monitoring and policing a part of a traffic class on a computer network, said part of a traffic class passing through a network device;

accumulating a measure of local traffic at said network device for multiple units of data for said traffic class as an accumulated measure of local traffic;

exporting said accumulated measure of local traffic to other network devices by transmitting a policer update packet (PUP);

receiving other policer update packets from said other network devices;

calculating, in response to said accumulated measure of local traffic and in response to said other policer update packets, a total measure of traffic of said class;

comparing said total measure with a set of policing parameters for an entire traffic class;

setting policing parameters to limit traffic for said entire traffic class;

setting an elapsed time threshold, and comparing a time elapsed since a last export of said accumulated measure of local traffic to said elapsed time threshold, and if said threshold is exceeded, then exporting said accumulated measure of local traffic that arrived during said elapsed time.

28. A method for policing traffic, comprising:

monitoring and policing a part of a traffic class on a computer network, said part of a traffic class passing through a network device;

accumulating a measure of local traffic at said network device for multiple units of data for said traffic class as an accumulated measure of local traffic;

exporting said accumulated measure of local traffic to other network devices by transmitting a policer update packet (PUP);

receiving other policer update packets from said other network devices;

calculating, in response to said accumulated measure of local traffic and in response to said other policer update packets, a total measure of traffic of said class;

comparing said total measure with a set of policing parameters for an entire traffic class;

setting policing parameters to limit traffic for said entire traffic class;

including a local rate in said accumulated measure of local traffic;

setting a threshold for traffic rate at said policer;

comparing said local rate with said threshold; and exporting, in response to said local rate exceeding said threshold, said accumulated measure of local traffic.

29. The method as in claim 23 further comprising:

setting policing parameters for multiple traffic classes; and exporting a measure of traffic for each class of said multiple traffic classes in one policer update message.

30. The method as in claim 23 further comprising:

using a same communication medium for transmitting said policer update message as is used by said network for said traffic being measured.

31. The method as in claim 23 further comprising:

exporting said accumulated measure of traffic using a communication medium separate from a medium used by said network for said traffic being measured.

32. A method for policing traffic, comprising:

monitoring and policing a part of a traffic class on a computer network, said part of a traffic class passing through a network device having individual policers;

configuring each policer with a policing bucket;

setting a contract rate and burst as said policing parameters;

accumulating a packet length of multiple local packets in a variable called byte count at each policer for this traffic class;

exporting an accumulated byte count in said accumulated measure of local traffic by transmitting a policer update packet (PUP);

calculating a policing bucket leak as a difference between said accumulated byte count and a product of said contract rate and a time interval elapsed since a last update of said policing bucket;

incrementing said policing bucket with said accumulated byte count less said policing bucket leak;

calculating, for each packet, the sum of, the policing bucket, accumulated byte count and said packet length of said packet, less the policing bucket leak, to obtain a calculated total; and policing said packet when said calculated total exceeds the policing parameter burst.

33. The method as in claim 32 further comprising:

defining a local alarm bucket at each individual policer;

defining a leak rate and threshold for said local alarm bucket;

calculating, for each packet, a leak of the local alarm bucket as the product of the local alarm bucket leak rate and a time elapsed since the arrival of a last local packet;

incrementing, for each local packet, said local alarm bucket by a packet length of said packet less a local alarm bucket leak to calculate a value of said local alarm bucket;

exporting, in response to said value of said local alarm bucket exceeding the threshold for the local alarm bucket, said accumulated measure of local traffic to all other policers.

34. A network device, comprising:

means for monitoring and policing a part of a traffic class on a computer network, said part of a traffic class passing through said network device;

means for accumulating a measure of local traffic at said network device for multiple units of data for said traffic class as an accumulated measure of local traffic;

means for exporting said accumulated measure of local traffic to other network devices by transmitting a policer update packet (PUP);

means for receiving other policer update packets from said other network devices;

means for calculating, in response to said accumulated measure of local traffic and in response to said other policer update packets, a total measure of traffic of said class;

means for comparing said total measure with a set of policing parameters for said entire traffic class;

means for setting policing parameters to limit traffic for an entire traffic class.

35. The apparatus as in claim 34 further, comprising:

means for arriving at policing decisions for said part of said traffic class passing through said network device.

36. The apparatus as in claim 34 further comprising:

means for designating a master policer, means for exporting said accumulated measure of local traffic only to said master policer; and means for receiving from said master policer said total measure of traffic accumulated by said master policer from policer update packets received by said master policer from other policers.

37. The apparatus as in claim 34 further comprising:

means for setting a threshold for an amount of traffic for said policer; and means for comparing said accumulated measure of local traffic to said threshold, and if said threshold is exceeded, then exporting said accumulated measure of local traffic.

38. A network device, comprising:

means for setting policing parameters to limit traffic for an entire traffic class;

means for monitoring and policing a part of a traffic class on a computer network, said part of a traffic class passing through said network device;

means for accumulating a measure of local traffic at said network device for multiple units of data for a traffic class;

means for exporting a measure of local traffic to other network devices by transmitting a policer update packet (PUP);

means for receiving other policer update packets from said other network devices;

means for calculating, in response to a measure of local traffic and in response to said other policer update packets, a total measure of traffic of said traffic class;

means for comparing said total measure with a set of policing parameters for said entire traffic class;

means for setting an elapsed time threshold, and means for comparing a time elapsed since a last export of said accumulated measure of local traffic to said elapsed time threshold, and if said threshold is exceeded, then exporting said accumulated measure of local traffic that arrived during said elapsed time.

39. A network device, comprising:

means for setting policing parameters to limit traffic for an entire traffic class, means for monitoring and policing a part of a traffic class on a computer network, said part of a traffic class passing through said network device;

means for setting a threshold for traffic rate;

means for accumulating a measure of local traffic, including a local rate, at said network device for multiple units of data for a traffic;

means for exporting a measure of local traffic to other network devices by transmitting a policer update packet (PUP);

means for receiving other policer update packets from said other network devices;

means for calculating, in response to a measure of local traffic and in response to said other policer update packets, a total measure of traffic of said class;

means for comparing said total measure with a set of policing parameters for said entire traffic class;

means for comparing said local rate with said threshold for traffic rate; and means for exporting, in response to said local rate exceeding said threshold, said accumulated measure of local traffic.

40. The apparatus as in claim 34 further comprising:

means for setting policing parameters for multiple traffic classes; and means for exporting a measure of traffic for each class of said multiple traffic classes in one policer update message.

41. The apparatus as in claim 34 further comprising:

means for using a same communication medium for transmitting said policer update message as is used by said network for said traffic being measured.

42. The apparatus as in claim 34 further comprising:

means for exporting said accumulated measure of traffic using a communication medium separate from a medium used by said network for said traffic being measured.

43. A network device, comprising:

means for monitoring and policing a part of a traffic class on a computer network, said part of a traffic class passing through said network device;

means for accumulating byte-count length of multiple local packets as a measure of local traffic at said network device, to obtain an accumulated byte-count;

means for exporting an accumulated byte-count as a measure of local traffic to other network devices by transmitting a policer update packet (PUP);

means for receiving an accumulated byte-count as a measure of local traffic from other policer update packets from said other network devices;

means for calculating, in response to a measure of local traffic and in response to said other policer update packets, a total measure of traffic of said class;

means for comparing said total measure with a set of policing parameters for said entire traffic class;

means for setting contract-rate and burst as policing parameters to limit traffic for an entire traffic class;

means for configuring said policer with a policing bucket;

means for calculating a policing bucket leak as a difference between said accumulated byte count and a product of said contract rate and a time interval elapsed since a last update of said policing bucket;

means for incrementing said policing bucket with said accumulated byte count less said policing bucket leak;

means for calculating, for each packet, the sum of, the policing bucket, accumulated byte count and said packet length of said packet, less the policing bucket leak, to obtain a calculated total; and means for policing said packet when said calculated total exceeds the policing parameter burst.

44. The apparatus as in claim 43 further comprising:

means for defining a local alarm bucket in each individual policer;

means for defining a leak rate and threshold for said local alarm bucket;

means for calculating, for each packet, a leak of the local alarm bucket as the product of the local alarm bucket leak rate and a time elapsed since the arrival of a last local packet;

means for incrementing, for each local packet, said local alarm bucket by a packet length of said packet less a local alarm bucket leak to calculate a value of said local alarm bucket;

means for exporting, in response to said value of said local alarm bucket exceeding a threshold for the local alarm bucket, said accumulated measure of local traffic to all said other policers.

45. A network device, comprising:

an input port to receive a part of a traffic class, said part of a traffic class passing through said network device;

a processor to monitor and police a part of a traffic class on a computer network, said part of a traffic class passing through said network device;

a policer to accumulate a measure of local traffic at said network device for multiple units of data for said traffic class as an accumulated measure of local traffic;

an output port to export said accumulated measure of local traffic to other network devices by transmitting a policer update packet (PUP);

other input ports to receive other policer update packets from said other network devices;

a processor to calculate, in response to said accumulated measure of local traffic and in response to said other policer update packets, a total measure of traffic of said class, and said processor comparing said total measure with a set of policing parameters for said entire traffic class;

said policer setting policing parameters to limit traffic for an entire traffic class.

46. The apparatus as in claim 45 further, comprising:

said policer to arrive at policing decisions for said part of said traffic class passing through said network device.

47. The apparatus as in claim 45 further comprising:

means for designating a master policer, means for exporting said accumulated measure of local traffic only to said master policer; and means for receiving from said master policer said total measure of traffic accumulated by said master policer from policer update packets received by said master policer from other policers.

48. The apparatus as in claim 45 further comprising:

said policer having means for setting a threshold for an amount of traffic for said policer; and said policer to compare said accumulated measure of local traffic to said threshold, and if said threshold is exceeded, then exporting said accumulated measure of local traffic.

49. A network device, comprising:

an input port to receive a part of a traffic class, said part of a traffic class passing through said network device;

a processor to monitor and police a part of a traffic class on a computer network, said part of a traffic class passing through said network device;

a policer to accumulate a measure of local traffic at said network device for multiple units of data for said traffic class as an accumulated measure of local traffic;

an output port to export said accumulated measure of local traffic to other network devices by transmitting a policer update packet (PUP);

other input ports to receive other policer update packets from said other network devices;

a processor to calculate, in response to said accumulated measure of local traffic and in response to said other policer update packets, a total measure of traffic of said class, and said processor comparing said total measure with a set of policing parameters for said entire traffic class;

said policer setting policing parameters to limit traffic for an entire traffic class;

means for setting an elapsed time threshold, and means for comparing a time elapsed since a last export of said accumulated measure of local traffic to said elapsed time threshold, and if said threshold is exceeded, then exporting said accumulated measure of local traffic that arrived during said elapsed time.

50. A network device, comprising:

an input port to receive a part of a traffic class, said part of a traffic class passing through said network device;

a processor to monitor and police a part of a traffic class on a computer network, said part of a traffic class passing through said network device;

a policer to accumulate a measure of local traffic at said network device for multiple units of data for said traffic class as an accumulated measure of local traffic;

an output port to export said accumulated measure of local traffic to other network devices by transmitting a policer update packet (PUP);

other input ports to receive other policer update packets from said other network devices;

a processor to calculate, in response to said accumulated measure of local traffic and in response to said other policer update packets, a total measure of traffic of said class, and said processor comparing said total measure with a set of policing parameters for said entire traffic class;

said policer setting policing parameters to limit traffic for an entire traffic class;

means for including a local rate in said accumulated measure of traffic;

means for setting a threshold for said traffic rate at said policer;

means for comparing said local rate with said threshold; and exporting, in response to said local rate exceeding said threshold, said accumulated measure of local traffic.

51. The apparatus as in claim 45 further comprising:

means for setting policing parameters for multiple traffic classes; and means for exporting a measure of traffic for each class of said multiple traffic classes in one policer update message.

52. The apparatus as in claim 45 further comprising:

means for using a same communication medium for transmitting said policer update message as is used by said network for said traffic being measured.

53. The apparatus as in claim 45 further comprising:

means for exporting said accumulated measure of traffic using a communication medium separate from a medium used by said network for said traffic being measured.

54. A network device, comprising:

an input port to receive a part of a traffic class, said part of a traffic class passing though said network device;

a processor to monitor and police a part of a traffic class on a computer network, said part of a traffic class passing through said network device;

a policer to accumulate a measure of local traffic, including a packet length of multiple local packets in a variable called byte count, at said network device for multiple units of data for said traffic class as an accumulated measure of local traffic, an output port to export said accumulated measure of local traffic, including byte count, to other network devices by transmitting a policer update packet (PUP);

other input ports to receive other policer update packets from said other network devices;

a processor to calculate, in response to said accumulated measure of local traffic and in response to said other policer update packets, a total measure of traffic of said class, and said processor comparing said total measure with a set of policing parameters for said entire traffic class;

said policer setting policing parameters, including contract rate and burst, to limit traffic for an entire traffic class;

means for configuring said policer with a policing bucket;

means for calculating a policing bucket leak as a difference between said accumulated byte count and a product of said contract rate and a time interval elapsed since a last update of said policing bucket;

means for incrementing said policing bucket with said accumulated byte count less said policing bucket leak;

means for calculating, for each packet, a calculated sum of the policing bucket, byte count and said packet length of said packet, less the policing bucket leak to obtain a calculated total; and means for policing said packet when said calculated sum exceeds the policing parameter burst.

55. The apparatus as in claim 54 further comprising:

means for defining a local alarm bucket in each individual policer;

means for defining a leak rate and threshold for said local alarm bucket;

means for calculating, for each packet, a leak of the local alarm bucket as the product of the local alarm bucket leak rate and a time elapsed since the arrival of a last local packet;

means for incrementing, for each local packet, said local alarm bucket by a packet length of said packet less a local alarm bucket leak to calculate a value of said local alarm bucket;

means for exporting, in response to said value of said local alarm bucket exceeding the threshold for the local alarm bucket, said accumulated measure of local traffic to all said other policers.

56. A method for policing traffic, comprising:

monitoring and policing a part of a traffic class on a computer network, said part of a traffic class passing through a network device;

accumulating a measure of local traffic at said network device for multiple units of data for said traffic class as an accumulated measure of local traffic;

exporting said accumulated measure of local traffic to other network devices by transmitting a policer update packet (PUP);

receiving other policer update packets from said other network devices;

calculating, in response to said accumulated measure of local traffic and in response to said other policer update packets, a total measure of traffic of said class;

comparing said total measure with a set of policing parameters for an entire traffic class;

setting policing parameters to limit traffic for said entire traffic class setting an elapsed time threshold;

comparing a time elapsed since a last export of said accumulated measure of local traffic to said elapsed time threshold, and if said threshold is exceeded, then exporting said accumulated measure of local traffic that arrived during said elapsed time.

57. A method for policing traffic, comprising:

monitoring and policing a part of a traffic class on a computer network, said part of a traffic class passing through a network device;

accumulating a measure of local traffic at said network device for multiple units of data for said traffic class as an accumulated measure of local traffic;

exporting said accumulated measure of local traffic to other network devices by transmitting a policer update packet (PUP);

receiving other policer update packets from said other network devices;

calculating, in response to said accumulated measure of local traffic and in response to said other policer update packets, a total measure of traffic of said class;

comparing said total measure with a set of policing parameters for an entire traffic class;

setting policing parameters to limit traffic for said entire traffic class;

configuring said policer with a policing bucket;

setting a contract rate and burst as said policing parameters;

accumulating a packet length of multiple local packets in a variable called byte count;

exporting an accumulated byte count in said accumulated measure of local traffic;

calculating a policing bucket leak as a difference between said accumulated byte count and a product of said contract rate and a time interval elapsed since a last update of said policing bucket;

incrementing said policing bucket with said accumulated byte count less said policing bucket leak;

calculating, for each packet, a calculated sum of the policing bucket, accumulated byte count and said packet length of said packet, less the policing bucket leak to obtain a calculated total; and policing said packet when said calculated total exceeds the policing parameter burst.

58. The method as in claim 56 or claim 57 further, comprising:

arriving at policing decisions for said part of said traffic class passing through said network device.

59. A computer readable media, comprising:

said computer readable media having instructions written thereon for execution on a processor for the practice of the method of claim 1 or claim 11 or claim 23 or claim 56 or claim 57.

60. Electromagnetic signals propagating on a computer netwrok comprising:

said electromagnetic signals carrying instructions for execution on a processor for the practice of the method of claim 1 or claim 11 or claim 23 or claim 56 or claim 57.

* * * * *